United States Patent
Nakano et al.

(10) Patent No.: US 8,897,947 B2
(45) Date of Patent: Nov. 25, 2014

(54) AUTONOMOUS MOBILE DEVICE

(75) Inventors: Tsuyoshi Nakano, Kyoto (JP); Shoji Tanaka, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 85 days.

(21) Appl. No.: 13/514,004

(22) PCT Filed: Oct. 22, 2010

(86) PCT No.: PCT/JP2010/006265
§ 371 (c)(1),
(2), (4) Date: Jun. 5, 2012

(87) PCT Pub. No.: WO2011/074165
PCT Pub. Date: Jun. 23, 2011

(65) Prior Publication Data
US 2012/0283905 A1 Nov. 8, 2012

(30) Foreign Application Priority Data

Dec. 17, 2009 (JP) .................. 2009-286846

(51) Int. Cl.
*G05D 1/00* (2006.01)
*G09B 29/00* (2006.01)
*G05D 1/02* (2006.01)
*G09B 29/10* (2006.01)

(52) U.S. Cl.
CPC ............ *G05D 1/0214* (2013.01); *G09B 29/007* (2013.01); *G05D 1/024* (2013.01); *G09B 29/10* (2013.01); *G05D 1/0274* (2013.01); *G05D 1/0238* (2013.01); *G05D 2201/0206* (2013.01); *Y10S 901/01* (2013.01); *Y10S 901/46* (2013.01)
USPC ............... 701/25; 701/23; 700/253; 700/258; 318/568.12; 901/1; 901/46

(58) Field of Classification Search
USPC ........... 701/25, 23; 700/258, 277, 253; 901/1, 901/46; 318/568.12
See application file for complete search history.

(56) References Cited

U.S. PATENT DOCUMENTS 7,386,163 B2 * 6/2008 Sabe et al. ..................... 382/153
7,389,156 B2 * 6/2008 Ziegler et al. .................. 700/245
(Continued)

FOREIGN PATENT DOCUMENTS

JP 3-30003 A 2/1991
JP 2000-222563 A 8/2000
(Continued)

OTHER PUBLICATIONS

Official Communication issued in corresponding International Application PCT/JP2010/006265, issued on Jul. 10, 2012.
(Continued)

*Primary Examiner* — Tuan C. To
(74) *Attorney, Agent, or Firm* — Keating & Bennett, LLP

(57) ABSTRACT

An autonomous mobile device that moves while autonomously avoiding zones into which entry should be avoided even if no obstacle exists therein includes a laser range finder that acquires peripheral obstacle information, a storage unit that stores an environment map that shows an obstacle zone where an obstacle exists, and a no-entry zone map which shows a no-entry zone into which entry is prohibited, a self-location estimation unit that estimates the self-location of a host device by using the obstacle information acquired by the laser range finder and the environment map, and a travel control unit that controls the host device to autonomously travel to the destination by avoiding the obstacle zone and the no-entry zone based on the estimated self-location, the environment map, and the no-entry zone map.

20 Claims, 12 Drawing Sheets

(56) References Cited

U.S. PATENT DOCUMENTS

| | | | |
|---|---|---|---|
| 7,539,557 B2* | 5/2009 | Yamauchi | 700/245 |
| 7,573,403 B2* | 8/2009 | Goncalves et al. | 340/995.1 |
| 8,155,811 B2* | 4/2012 | Noffsinger et al. | 701/21 |
| 8,180,486 B2* | 5/2012 | Saito et al. | 700/245 |
| 8,474,090 B2* | 7/2013 | Jones et al. | 15/319 |
| 8,521,330 B2* | 8/2013 | Park et al. | 700/258 |
| 8,538,458 B2* | 9/2013 | Haney | 455/456.2 |
| 8,671,711 B2* | 3/2014 | Kim | 62/420 |
| 8,700,050 B1* | 4/2014 | Thomas | 455/456.1 |
| 8,739,355 B2* | 6/2014 | Morse et al. | 15/319 |
| 2004/0199292 A1 | 10/2004 | Sakagami et al. | |
| 2005/0075785 A1* | 4/2005 | Gray et al. | 701/202 |
| 2007/0028574 A1* | 2/2007 | Yan | 55/503 |
| 2007/0179670 A1* | 8/2007 | Chiappetta et al. | 700/245 |
| 2007/0219667 A1* | 9/2007 | Jung et al. | 700/245 |
| 2009/0281661 A1* | 11/2009 | Dooley et al. | 700/258 |
| 2010/0013615 A1* | 1/2010 | Hebert et al. | 340/425.5 |
| 2010/0049365 A1* | 2/2010 | Jones et al. | 700/253 |
| 2010/0198443 A1 | 8/2010 | Yabushita et al. | |
| 2010/0268697 A1* | 10/2010 | Karlsson et al. | 707/694 |
| 2011/0298923 A1* | 12/2011 | Mukae | 348/144 |
| 2012/0035797 A1* | 2/2012 | Oobayashi et al. | 701/23 |
| 2012/0143430 A1* | 6/2012 | Broggi et al. | 701/28 |
| 2012/0191287 A1* | 7/2012 | Shin et al. | 701/28 |

FOREIGN PATENT DOCUMENTS

| | | |
|---|---|---|
| JP | 2004-299025 A | 10/2004 |
| JP | 2005-50105 A | 2/2005 |
| JP | 2005-157625 A | 6/2005 |
| JP | 2005-222560 A | 8/2005 |
| JP | 2006-107475 A | 4/2006 |
| JP | 2007-249632 A | 9/2007 |
| WO | 2008/113098 A1 | 9/2008 |

OTHER PUBLICATIONS

Official Communication issued in International Patent Application No. PCT/JP2010/006265, mailed on Dec. 7, 2010.

Official Communication issued in corresponding European Patent Application No. 10837203.8, mailed on Jul. 25, 2013.

Murarka et al., "A Stereo Vision Based Mapping Algorithm for Detecting Inclines, Drop-offs, and Obstacles for Safe Local Navigation," IEEE/RSJ International Conference on Intelligent Robots and Systems, Oct. 11-15, 2009, pp. 1646-1653.

Saitoh et al., "Effective Strategy for Autonomous Navigation without Prior Knowledge in FastSLAM," IEEE Robotic Intelligence in Informationally Structured Space, Mar. 30, 2009, pp. 30-37.

* cited by examiner

OBSTACLE (OBSTACLE ZONE)

NO OBSTACLE

NO-ENTRY ZONE

ZONE OTHER THAN NO-ENTRY ZONE

FIG. 6

| ANGLE NUMBER | DISTANCE (mm) |
|---|---|
| ... | ... |
| 100 | 2525 |
| 101 | 2472 |
| 102 | 2510 |
| ... | ... |

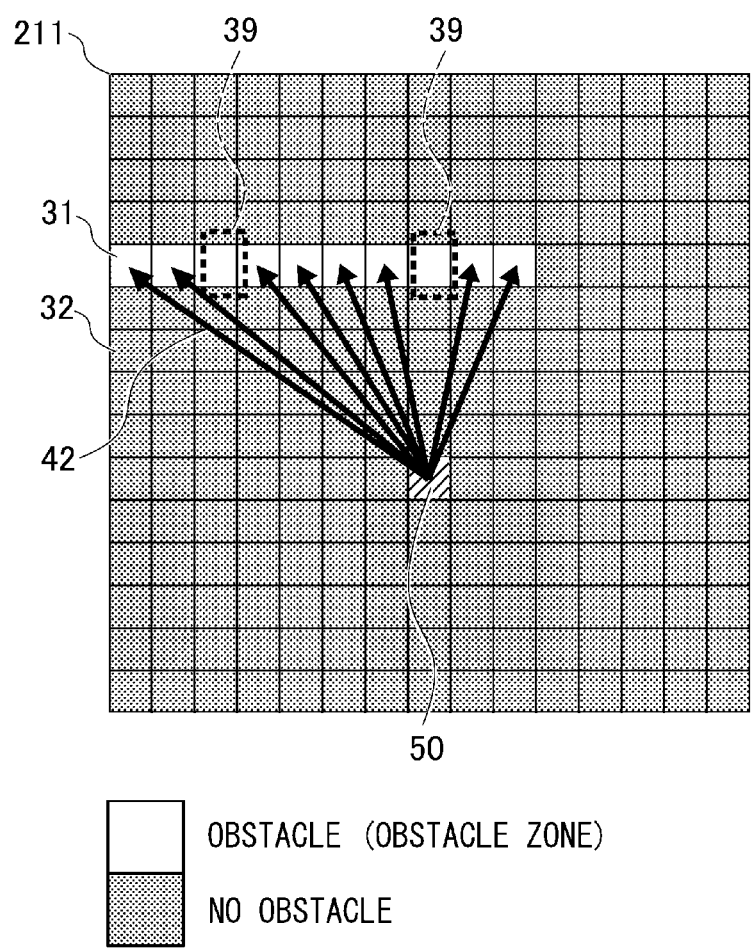

AUTONOMOUS MOBILE DEVICE

BACKGROUND OF THE INVENTION

1. Field of the Invention

The present invention relates to an autonomous mobile device which autonomously moves to a destination.

2. Description of the Related Art

A conventional autonomous mobile device autonomously moves to a destination while avoiding obstacles by using map information showing the shape of obstacles such as walls, and a horizontal distance from a host device to the obstacle measured by a distance sensor (for instance, refer to Japanese Patent Application Publication No. 2005-157625).

Meanwhile, zones into which the entry by the autonomous mobile device should be avoided are not necessarily limited to zones containing obstacles. For example, in an environment of a hospital or the like, as zones into which the entry by the autonomous mobile device should be avoided, there are stepped zones such as stairs where the autonomous mobile device is unable to travel and zones such as treatment rooms of patients that would be dangerous if the autonomous mobile device were to travel therein. In the foregoing case, even if it is a zone where an obstacle does not exist, it is necessary to perform control to avoid entry of the autonomous mobile device into such zone. Nevertheless, with the autonomous mobile device described in Japanese Patent Application Publication No. 2005-157625, it is not possible to detect the foregoing zones into which entry by the autonomous mobile device should be avoided unless an obstacle exists therein. Thus, the autonomous mobile device is unable to move while autonomously avoiding zones into which entry should be avoided even though no obstacle exists therein.

SUMMARY OF THE INVENTION

In view of the problems described above, preferred embodiments of the present invention provide an autonomous mobile device capable of moving while autonomously avoiding zones into which entry should be avoided even if no obstacle exists therein.

An autonomous mobile device according to a preferred embodiment of the present invention includes an obstacle sensor that acquires peripheral obstacle information, a storage device that stores an environment map showing an obstacle zone where an obstacle exists, and a no-entry zone map showing a no-entry zone into which entry is prohibited, an estimation device that estimates a self-location of the mobile device by using obstacle information acquired by the obstacle sensor and the environment map, and a controller arranged and programmed to control autonomous movement based on the self-location estimated by the estimation device, the environment map, and the no-entry zone map.

According to a preferred embodiment of the autonomous mobile device of the present invention, in addition to the environment map showing the obstacle zone, a no-entry zone map showing the no-entry zone into which entry of the autonomous mobile device is prohibited is also stored in the storage device. In addition, the self-location of the host device on the environment map is estimated by the estimation device based on the environment map and the acquired obstacle information. Consequently, the self-location of the host device on the environment map can be estimated without being affected by the no-entry zone based on the obstacle information acquired by the obstacle sensor and the environment map. Accordingly, it is possible to prevent errors in the estimation of the self-location. Moreover, the autonomous movement is controlled by the controller based on the estimated self-location, the environment map, and the no-entry zone map. The autonomous mobile device is thereby able to move while avoiding the obstacle zone and the no-entry zone and estimating the self-location. In other words, the autonomous mobile device can move while autonomously avoiding zones into which entry should be avoided even if no obstacle exists therein.

Preferably, the autonomous mobile device according to a preferred embodiment of the present invention includes a reception device that receives an operation to set the no-entry zone, and the storage device stores the no-entry zone map set based on the operation received by the reception device. In the foregoing case, the no-entry zone can be arbitrarily set by the user.

Preferably, the autonomous mobile device according to a preferred embodiment of the present invention preferably also includes a synthesizing device that generates a composite map by synthesizing the environment map and the no-entry zone map. Moreover, preferably, the synthesizing device generates the composite map which reflects both an obstacle zone shown on the environment map and a no-entry zone shown on the no-entry zone map for each of pixels corresponding mutually to the environment map and the no-entry zone map. Moreover, preferably, the autonomous mobile device also includes a planning device that plans a path to a destination by using the composite map generated by the synthesizing device, and the controller controls the autonomous movement based on the path planned by the planning device. In the foregoing case, since the planning device plans the path based on the composite map, it is possible to plan a path that avoids both the obstacle zone and the no-entry zone.

Preferably, the autonomous mobile device according to a preferred embodiment of the present invention also includes a calculation device that calculates avoidance information based on the obstacle zone and the no-entry zone by using the self-location estimated by the estimation device and the composite map generated by the synthesizing device, and the controller performs control to avoid an obstacle by using the avoidance information calculated by the calculation device and the obstacle information acquired by the obstacle sensor.

In the foregoing case, the avoidance information based on the obstacle zone and the avoidance information based on the no-entry zone in the composite map are calculated based on the self-location. Consequently, even in cases where the obstacle information cannot be acquired by the obstacle sensor, it is possible to acquire the avoidance information based on the obstacle zone. Consequently, it is possible to more reliably perform the control of avoiding obstacles. Moreover, the avoidance information of the no-entry zone is calculated, and the control of avoiding obstacles by using the calculated avoidance information is performed. Consequently, control to avoid the no-entry zone can be performed by designating the no-entry zone as a zone to be avoided as with the obstacle zone.

With the autonomous mobile device according to a preferred embodiment of the present invention, preferably, the calculation device generates a virtual sensor output by calculating the avoidance information that is compatible with an output format of the obstacle information acquired by the obstacle sensor. In the foregoing case, the avoidance information calculated by the calculation device can be subject to information processing by using the same algorithm as the obstacle information acquired by the obstacle sensor.

Preferably, the autonomous mobile device according to a preferred embodiment of the present invention also includes an integration device that integrates the obstacle information acquired by the obstacle sensor and the avoidance information calculated by the calculation device, and the controller performs control to avoid an obstacle by using the obstacle information and the avoidance information integrated by the integration device. In the foregoing case, even in cases where the number of obstacle sensors is changed, the integrated obstacle information is input to the controller and, therefore, the need to change software in the controller can be minimized.

With the autonomous mobile device according to a preferred embodiment of the present invention, preferably, the obstacle sensor is a laser range finder.

According to various preferred embodiments of the present invention, the autonomous mobile device can move while autonomously avoiding zones into which entry should be avoided even if no obstacle exists therein.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a chart showing an example of the obstacle information that is used by the autonomous mobile device.

FIG. 7A is a diagram explaining the actual obstacle information based on the laser range finder and the virtual obstacle information based on the map sensor provided in the autonomous mobile device.

DETAILED DESCRIPTION OF THE PREFERRED EMBODIMENTS

The preferred embodiments of the present invention are now explained in detail with reference to the drawings.

Figure 1:
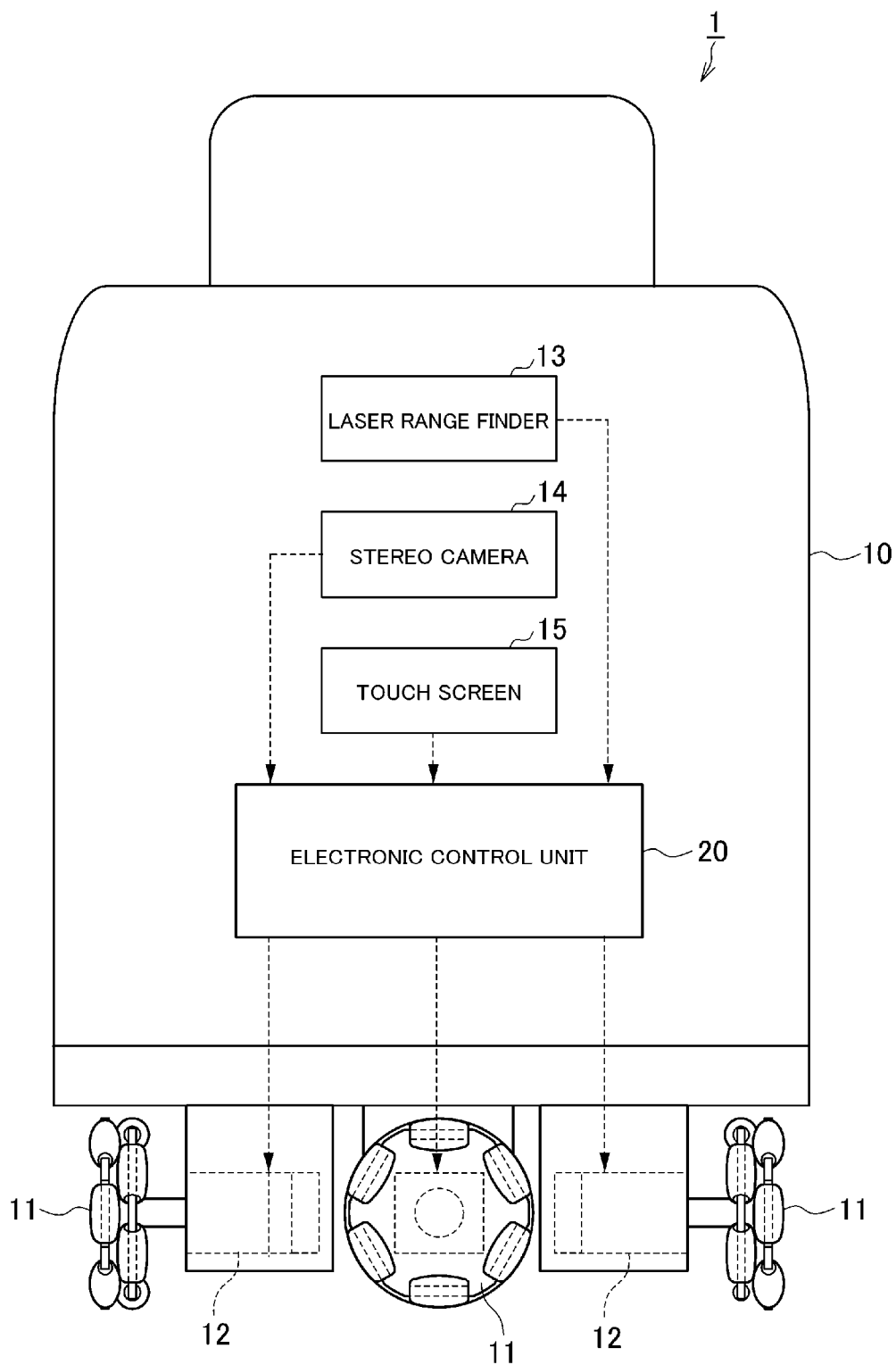
FIG. 1 is a diagram explaining the configuration of the autonomous mobile device according to a preferred embodiment of the present invention.

The configuration of the autonomous mobile device 1 according to the present preferred embodiment is foremost explained with reference to FIG. 1. FIG. 1 is a diagram explaining the configuration of the autonomous mobile device 1 according to the present preferred embodiment. The autonomous mobile device 1 is a device which autonomously moves to a destination while avoiding obstacles such as people and objects as well as the no-entry zones that are set.

The autonomous mobile device 1 preferably includes a hollow cylindrical main body 10 made of metal, four omni wheels 11 provided at the lower side of the main body 10, and four electric motors 12 that drive the omni wheels 11. The autonomous mobile device 1 can move in an arbitrary direction on the travel surface by individually adjusting the rotating direction and rotation speed of each of the four omni wheels 11 based on the respective electric motors 12. Moreover, the autonomous mobile device 1 includes a laser range finder 13, a stereo camera 14, a touch screen 15, and an electronic control unit 20.

The laser range finder 13 is a sensor arranged to acquire peripheral obstacle information of obstacles around a host device, and is a non-limiting example of an obstacle sensor recited in the claims. The laser range finder 13 is preferably mounted at the front of the main body 10, emits a laser in a fan shape and in a horizontal direction, and measures the propagation time of the reflected wave that was reflected off an obstacle with respect to the respective emission angles. The emission angle, and the distance that is calculated from the propagation time of the reflected wave, are the obstacle information that is output from the laser range finder 13.

The stereo camera 14 calculates the distance and angle from the host device to the obstacle based on the principle of triangulation using stereo imagery. The foregoing distance and angle are the obstacle information that is output from the stereo camera 14. The touch screen 15 is an input device preferably defined by a liquid crystal display and a touch panel. When a user performs a touch operation to the information displayed on the liquid crystal display, the touch panel detects the touch operation and the user's operation is thereby received.

The electronic control unit 20 inputs the obstacle information that was output from the laser range finder 13 and the stereo camera 14, and thereby performs control of the autonomous movement. Thus, the electronic control unit 20 preferably includes a microprocessor that performs computations, a ROM that stores programs and the like which are used for causing the microprocessor to perform various types of processing, a RAM that temporarily stores various types of data such as the computational results, a backup RAM or a hard disk that retains such stored contents, and so on.

Figure 2:
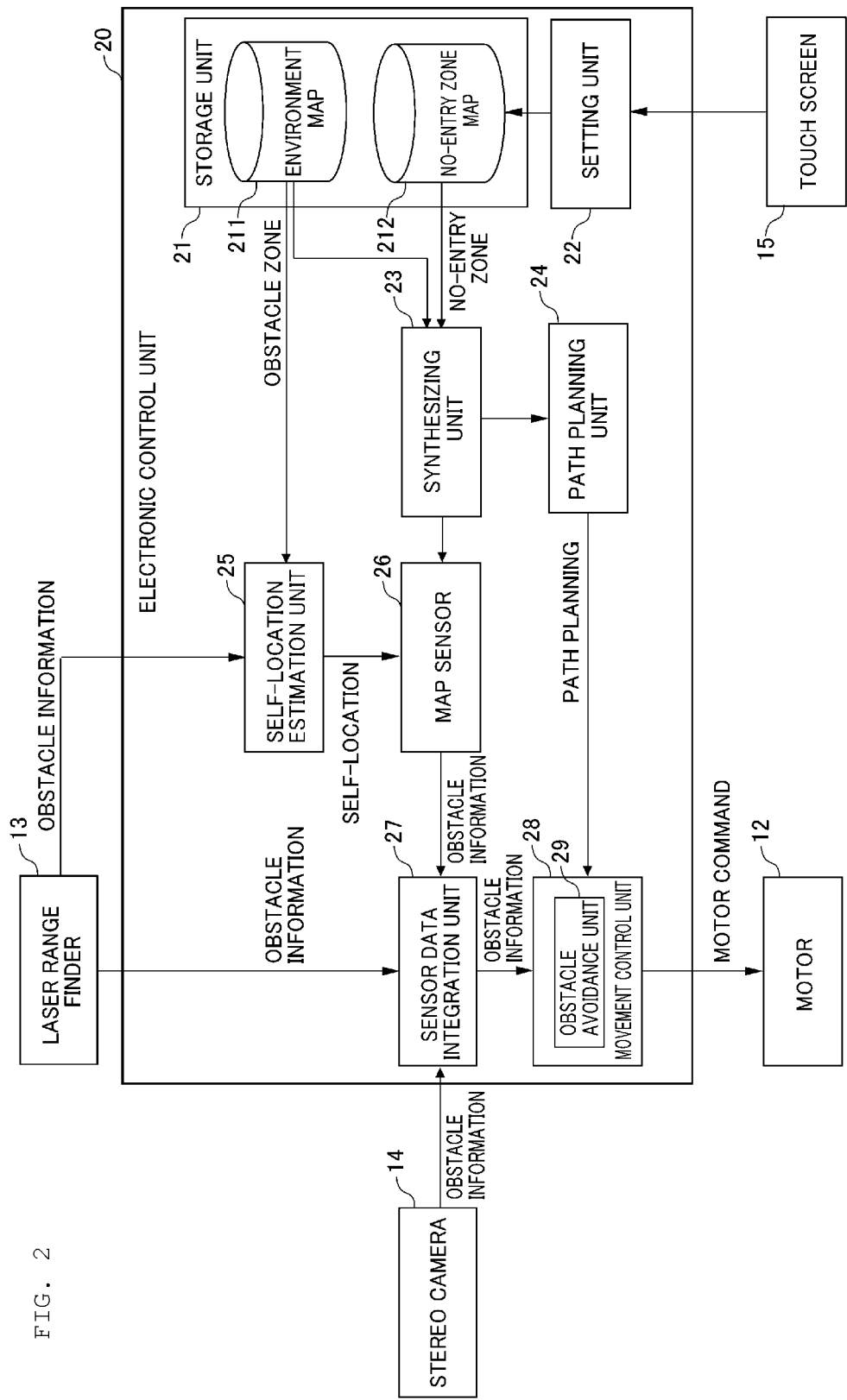
FIG. 2 is a block diagram showing the functional configuration of the electronic control unit provided in the autonomous mobile device.

The functional components of the electronic control unit 20 that are realized by combining the foregoing hardware and software are now explained with reference to FIG. 2. FIG. 2 is a block diagram showing the functional configuration of the electronic control unit 20. The electronic control unit 20 preferably includes a storage unit 21, a setting unit 22, a synthesizing unit 23, a path planning unit 24, a self-location estimation unit 25, a map sensor 26, a sensor data integration unit 27, and a travel control unit 28.

The storage unit 21 preferably includes a backup RAM or the like, and stores an environment map 211 and a no-entry zone map 212. In other words, the storage unit 21 is a non-limited example of a storage device recited in the claims. The environment map 211 and the no-entry zone map 212 are stored on different layers, and stored so that a change to one does not affect the other.

Figure 3A:
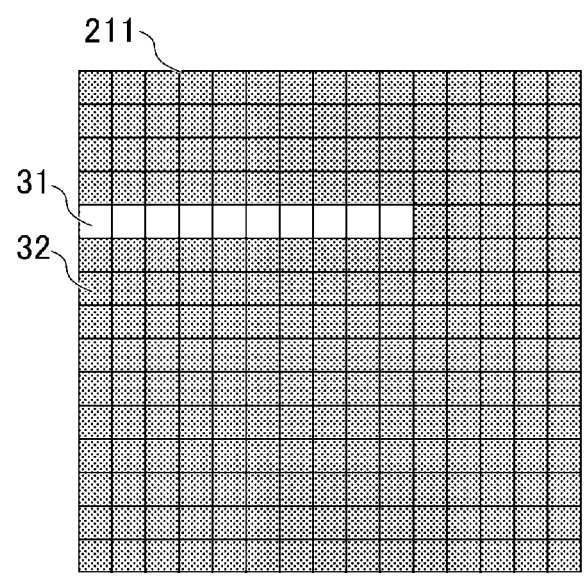
FIG. 3A is a diagram showing an example of the environment map that is used by the autonomous mobile device.
Figure 3A:
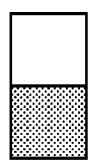

As shown in FIG. 3A, the environment map 211 is a map showing an obstacle zone 31 where an obstacle exists. In FIG. 3A, the white zone shows the obstacle zone 31 where an obstacle exists, and the gray zone shows a zone 32 where an obstacle does not exist. The obstacle zone 31 shown in the environment map 211 is a zone where an immobile and static obstacle exists, for example, is a zone that is occupied by a wall, furniture or the like. The obstacle zone 31 is a zone that is detected in advance by the laser range finder 13 and/or the stereo camera 14. Note that the obstacle zone 31 can also be created by adding data of walls or furniture to the CAD data of the building in which the autonomous mobile device 1 is to move.

Figure 3B:
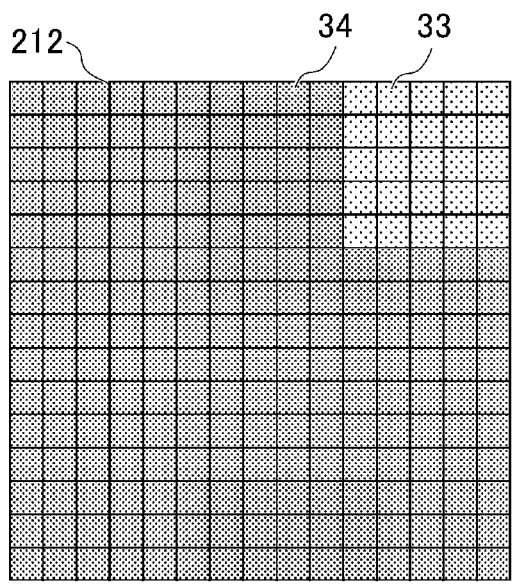
FIG. 3B is a diagram showing an example of the no-entry zone map that is used by the autonomous mobile device.
Figure 3B:
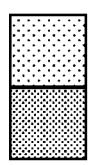

As shown in FIG. 3B, the no-entry zone map 212 is a map showing a no-entry zone 33. In FIG. 3B, the light gray zone shows the no-entry zone 33, and the dark gray zone shows a zone 34 other than the no-entry zone. The no-entry zone 33 is a zone that is set to prohibit entry of the autonomous mobile device 1. While the laser range finder 13 and the stereo camera 14 can detect obstacles in the no-entry zone 33, the laser range finder 13 and the stereo camera 14 are unable to detect the no-entry zone 33 itself.

The no-entry zone 33 can be arbitrarily set by the user. For example, by setting the no-entry zone 33 in front of stairs or steps on which the autonomous mobile device 1 is unable to travel, it is possible to prevent the autonomous mobile device 1 from entering such stairs or steps. Moreover, a zone such as a treatment room of a hospital where it would be dangerous if the autonomous mobile device 1 moved therein may also be set as the no-entry zone 33. Note that a zone where an obstacle exists but which cannot be detected by the laser range finder 13 or the stereo camera 14, or in which the detection of that zone by the laser range finder 13 or the stereo camera 14 is difficult, may also be set as the no-entry zone 33.

The no-entry zone 33 can be arbitrarily set by the user via the touch screen 15. Specifically, when the user designates a no-entry zone by way of the touch operation on the environment map 211 displayed on the touch screen 15, the touch screen 15 receives the user's touch operation. In other words, the touch screen 15 is a non-limiting example of a reception device recited in the claims. The touch screen 15 outputs the received information of the touch operation to the setting unit 22.

The setting unit 22 sets the designated no-entry zone on the no-entry zone map 212 based on the touch operation that was output from the touch screen 15, and outputs the information of the set no-entry zone map 212 to the storage unit 21. Consequently, the no-entry zone arbitrarily set by the user is reflected on the no-entry zone map 212 in the storage unit 21.

Figure 3C:
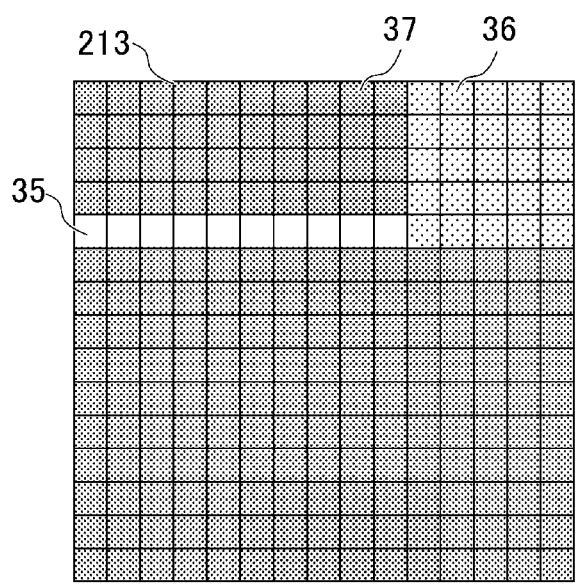
FIG. 3C is a diagram showing an example of the composite map that is used in the autonomous mobile device.
Figure 3C:
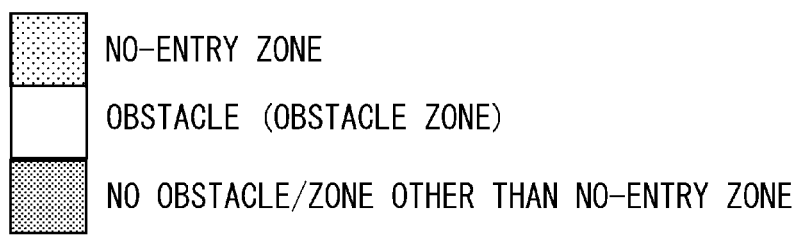

The synthesizing unit 23 generates a composite map 213 by synthesizing the environment map 211 and the no-entry zone map 212. In other words, the synthesizing unit 23 is a non-limiting example of a synthesizing device recited in the claims. As shown in FIG. 3C, in the composite map 213, the obstacle zone 31 indicated by the environment map 211 and the no-entry zone 33 indicated by the no-entry zone map 212 are both reflected for each of pixels corresponding mutually to the environment map 211 and the no-entry zone map 212. In this preferred embodiment, a pixel refers to each of the rectangular zones divided by a grid in FIG. 3A to FIG. 3C.

The obstacle zone 31 of the environment map 211 is reflected in the white zone 35 in FIG. 3C. The no-entry zone 33 of the no-entry zone map 212 is reflected in the light gray zone 36. The dark gray zone 37 is a zone other than the obstacle zone 31 and the no-entry zone 33.

The path planning unit 24 plans a path to the destination by using the composite map 213 generated by the synthesizing unit 23. In other words, the path planning unit 24 is a non-limiting example of a planning device recited in the claims. The path planning unit 24 plans the path so as to enable movement while avoiding both the obstacle zone 31 contained in the environment map 211 and the no-entry zone 33 contained in the no-entry zone map 212 by using the composite map 213.

The self-location estimation unit 25 estimates the self-location of the host device by using the obstacle information output from the laser range finder 13, and the environment map 211. In other words, the self-location estimation unit 25 is a non-limiting example of an estimation device recited in the claims. The method of estimating the self-location of the host device is now explained with reference to FIG. 4A and FIG. 4B. Note that FIG. 4A and FIG. 4B are diagrams explaining the method of estimating the self-location of the host device by using the self-location estimation unit 25.

Figure 4A:
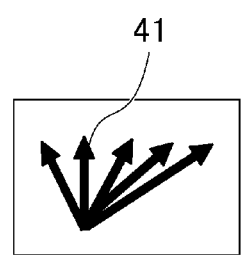
FIG. 4A is a diagram explaining the method of estimating the self-location by using the self-location estimation unit provided in the autonomous mobile device.

The five arrows shown in FIG. 4A correspond to the five types of obstacle information 41 that are output from the laser range finder 13. The arrows showing the obstacle information 41 represent the emission angle and distance included in the obstacle information 41. The self-location estimation unit 25 searches for the coordinates in which the degree of coincidence between the obstacle zone 31 and the obstacle information 41, which is output from the laser range finder 13, on the environment map 211 is highest, and estimates the coordinates with the highest degree of coincidence as the self-location.

Figure 4B:
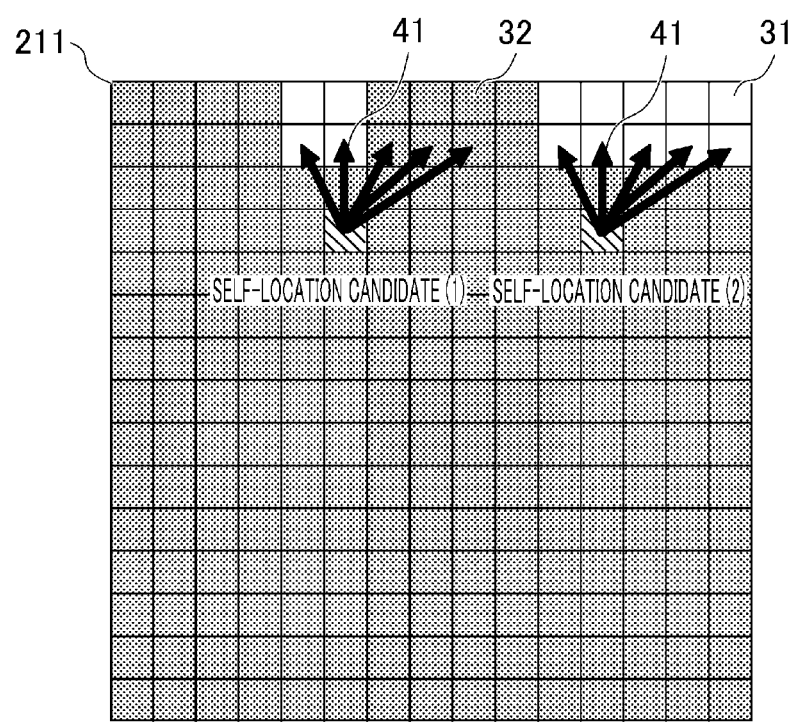
FIG. 4B is a diagram explaining the method of estimating the self-location by using the self-location estimation unit provided in the autonomous mobile device.

As shown in FIG. 4B, upon comparing self-location candidate (1) and self-location candidate (2), the degree of coincidence between the obstacle zone 31 and the obstacle information 41 is higher in the self-location candidate (2). In the foregoing case, the self-location candidate (2) is estimated as the self-location. Moreover, the self-location estimation unit 25 estimates the facing direction of the host device on the environment map 211. The self-location estimation unit 25 estimates the facing direction of the host device, for example, based on the rotation of the omni wheels 11, and information of the respective emission angles contained in the obstacle information 41.

Note that the environment map 211, and not the composite map 213, is used upon estimating the self-location of the host device. This is because, if the self-location of the host device is estimated using the composite map 213, it is likely that the self-location will be estimated erroneously since it is not possible to differentiate the obstacle zone 31 that can be detected by the laser range finder 13 and the no-entry zone 33 that cannot be detected by the laser range finder 13.

As described above, with the autonomous mobile device 1, the environment map 211 is used upon estimating the self-location of the host device. Meanwhile, the composite map 213 obtained by synthesizing the environment map 211 and the no-entry map 212 is used upon planning the path to the destination. Thus, with the autonomous mobile device 1, the storage unit 21 stores the environment map 211 and the no-entry zone map 212 on different layers, and the synthesizing unit 23 generates the composite map 213 by synthesizing the environment map 211 and the no-entry zone map 212.

Figure 5:
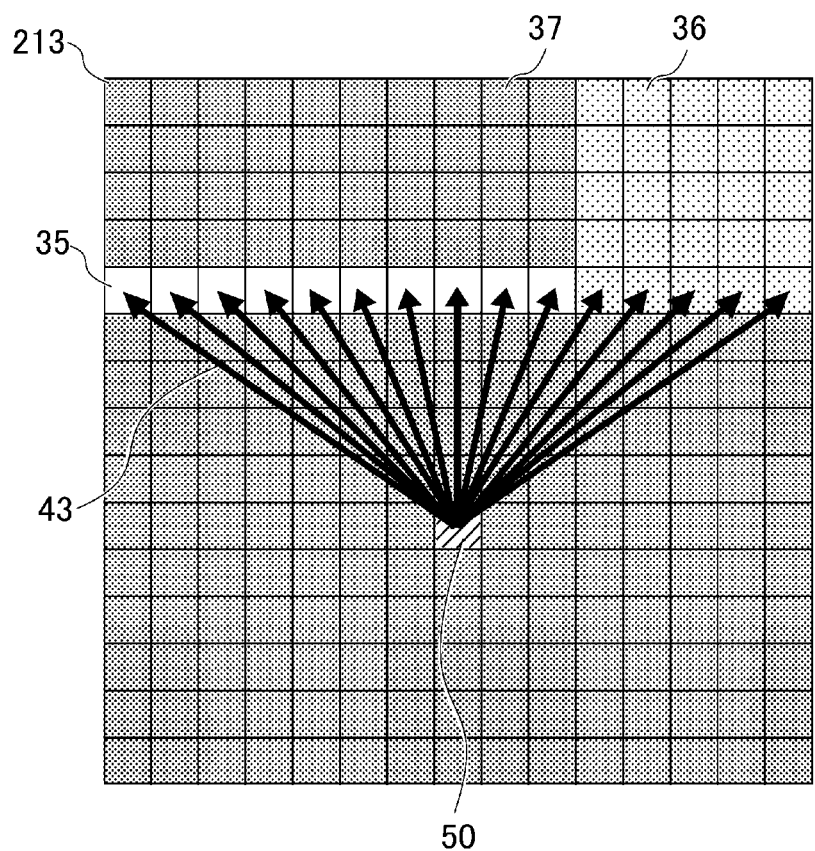
FIG. 5 is a diagram explaining the map sensor provided in the autonomous mobile device.

The map sensor 26 calculates virtual obstacle information corresponding to the obstacle zone 31 and the no-entry zone 33 by using the estimated self-location and the composite map 213. The virtual obstacle information is avoidance information that is generated based on the obstacle zone 31 and the no-entry zone 33 in the composite map 213, and is used for avoidance control. In other words, the map sensor 26 is a non-limiting example of a calculation device recited in the claims. The map sensor 26 is now explained with reference to FIG. 5. The arrows shown in FIG. 5 represent the virtual obstacle information 43 that is calculated by the map sensor 26.

The map sensor 26 projects the estimated self-location 50 on the composite map 213, and calculates a virtual sensor output as the obstacle information 43. The virtual sensor output is an output that is obtained by a virtual sensor positioned at the self-location 50 upon designating that a zone 35 corresponding to the obstacle zone 31 and a zone 36 corresponding to the no-entry zone 33 are zones in which an obstacle virtually exists. In other words, the obstacle information 43 is not information of an obstacle that is detected based on the existence of an actual obstacle, and is virtual obstacle information generated via computation.

The virtual obstacle information 43 includes the same data format as the actual obstacle information that is output from the laser range finder 13 and the stereo camera 14. FIG. 6 is a table showing the data format of the virtual obstacle information 43. As shown in FIG. 6, the virtual obstacle information 43 includes information showing the angle number (for example, 100) and the distance from the host device to the obstacle (for example, 2525 mm). Note that the angle number corresponds to the emission angle of the obstacle information that is output from the laser range finder 13.

The sensor data integration unit 27 integrates the actual obstacle information acquired from the laser range finder 13 and the stereo camera 14, and the virtual obstacle information 43 calculated by the map sensor 26. In other words, the sensor data integration unit 27 is a non-limiting example of an integration device recited in the claims.

For example, there are cases where the distance in which the detection of an obstacle by the laser range finder 13 is guaranteed is 5 m, and the same distance for the stereo camera 14 is 10 m. In the foregoing case, the sensor data integration unit 27 deletes the actual obstacle information that is input for those in which the distance is greater than 5 m, and integrates such obstacle information related to a distance of 5 m or less, for example.

Figure 7B:
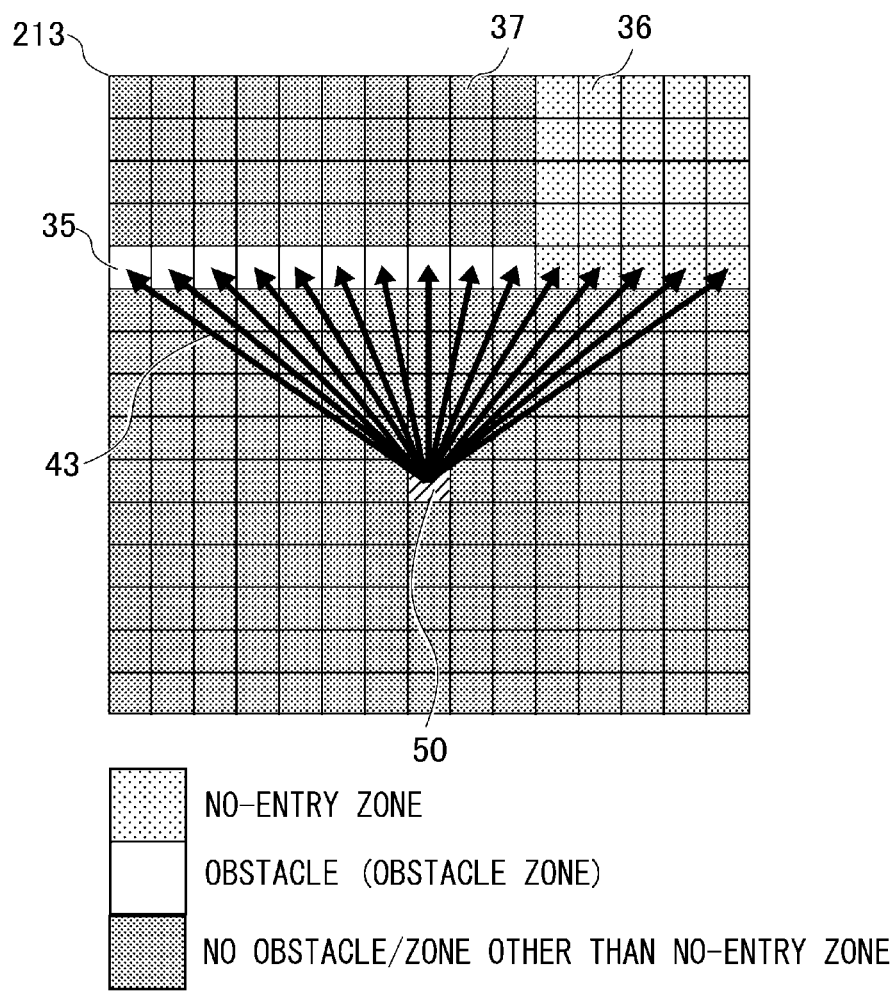
FIG. 7B is a diagram explaining the actual obstacle information based on the laser range finder and the virtual obstacle information based on the map sensor provided in the autonomous mobile device.

As a result of the actual obstacle information and the virtual obstacle information 43 being integrated, the obstacle information that could not be acquired by the laser range finder 13 or the stereo camera 14 due to an error or other factors can be complemented using the virtual obstacle information 43 calculated by the map sensor 26. This point is now explained with reference to FIG. 7A and FIG. 7B. FIG. 7A shows the actual obstacle information 42 acquired by the laser range finder 13 at a certain point in time.

The rectangular zone 39 shown with a broken line is a zone that is located in the obstacle zone 31, but could not be detected by the laser range finder 13. This is a result of the laser range finder 13 not being able to detect the reflected wave depending on the color or material of the obstacle or the reflecting angle of the laser. Thus, so-called flickering where an obstacle is detected by the laser range finder 13 at a certain moment but is not detected the next moment may occur.

Meanwhile, as shown in FIG. 7B, the virtual obstacle information 43 calculated by the map sensor 26 is calculated based on the zone 35 corresponding to the pre-stored obstacle zone 31. Thus, the virtual obstacle information 43 corresponding to the zone 39 that could not be detected by the laser range finder 13 is included therein. By integrating the virtual obstacle information 43 calculated by the map sensor 26 and the actual obstacle information acquired by the laser range finder 13 and the stereo camera 14, it is possible to complement the obstacle information that could not be acquired by the laser range finder 13 or the stereo camera 14. It is thereby possible to prevent so-called flickering, and stably obtain obstacle information.

The travel control unit 28 controls the motor 12 so that the host device travels along the path planned by the path planning unit 24 based on the self-location estimated by the self-location estimation unit 25. The travel control unit 28 preferably includes an obstacle avoiding unit 29. Upon detecting an obstacle while moving to the destination along the path planned by the path planning unit 24, the obstacle avoiding unit 29 performs interference calculation of the host device and the obstacle by using the obstacle information output from the sensor data integration unit 27, and thereby performs control to avoid the obstacle. The control to avoid obstacles includes the control of stopping or circumventing the host device so that the host device will not come into contact with the obstacle.

Figure 8:
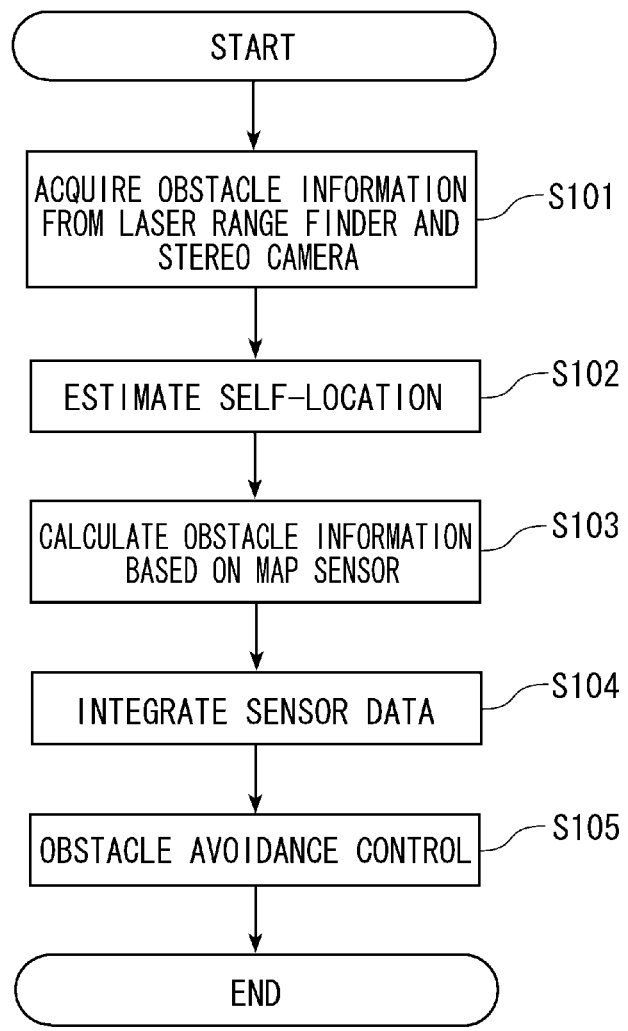
FIG. 8 is a flowchart showing the processing routine of the obstacle avoidance control to be performed by the autonomous mobile device.

The processing routine of the obstacle avoidance control to be performed by the autonomous mobile device 1 is now explained with reference to FIG. 8. FIG. 8 is a flowchart showing the processing routine of the obstacle avoidance control to be performed by the autonomous mobile device 1. The obstacle avoidance control is executed by the electronic control unit 20 when the autonomous mobile device 1 autonomously moves the destination along the planned path.

Foremost, in step S101, the actual obstacle information acquired by the laser range finder 13 and the stereo camera 14 is read. Subsequently, in step S102, the self-location of the host device is estimated by the self-location estimation unit 25 based on the environment map 211 and the actual obstacle information acquired by the laser range finder 13. Note that the method of estimating the self-location of the host device is as described above, and the detailed explanation thereof is omitted here.

In addition, in step S103, the virtual obstacle information 43 as the virtual sensor output based on the self-location of the host device is calculated by the map sensor 26 by using the composite map 213 obtained by synthesizing the environment map 211 and the no-entry zone map 212. In other words, generated is a sensor output that is obtained by a virtual sensor positioned at the self-location 50 upon designating that a zone 35 corresponding to the obstacle zone 31 and a zone 36 corresponding to the no-entry zone 33 are zones in which an obstacle virtually exists.

Subsequently, in step S104, the actual obstacle information read in step S101 and the virtual obstacle information 43 calculated in step S103 are integrated by the sensor data integration unit 27. In other words, the obstacle information acquired by the laser range finder 13 and the stereo camera 14, and the virtual obstacle information 43 corresponding to the obstacle zone 31 and the no-entry zone 33 calculated by the map sensor 26 are integrated.

In addition, in step S105, control to avoid obstacles is performed by the travel control unit 28 based on the obstacle information that was integrated in step S104. Consequently, the autonomous mobile device 1 can move while avoiding the obstacle zone 31 on the environment map 211, the no-entry zone 33 on the no-entry zone map 212, and the dynamic obstacles detected by the laser range finder 13 and the stereo camera 14 while traveling. The foregoing processing shown in FIG. 8 is repeatedly executed for every control cycle of the autonomous mobile device 1.

With the autonomous mobile device 1 according to the present preferred embodiment explained above, in addition to the environment map 211 showing the obstacle zone 31, the no-entry zone map 212 showing the no-entry zone 33 is also stored in the storage unit 21. In addition, the self-location of the host device is estimated based on the actual obstacle information and the obstacle zone 31. Accordingly, it is possible to prevent the erroneous estimation of the self-location of the host device. Meanwhile, the autonomous movement is controlled based on the estimated self-location, and the composite map 213 obtained by synthesizing the environment map 211 and the no-entry zone map 212. The autonomous mobile device 1 can thereby move while avoiding the obstacle zone 31 and the no-entry zone 33. In other words, the autonomous mobile device 1 can move while autonomously avoiding zones into which entry should be avoided even if no obstacle exists therein.

Moreover, according to the present preferred embodiment, the operation to set the no-entry zone 33 is received by the touch screen 15, and the set no-entry zone 33 is reflected in the no-entry zone map 212. Thus, the user can arbitrarily set the no-entry zone 33 in accordance with the situation.

According to the present preferred embodiment, since the path to the destination is planned based on the composite map 213, it is possible to plan a path that will avoid both the obstacle zone 31 and the no-entry zone 33.

Moreover, according to the present preferred embodiment, the virtual obstacle information 43 corresponding to the obstacle zone 31 and the virtual obstacle information 43 corresponding to the no-entry zone 33 on the composite map 213 are calculated based on the self-location of the host device. It is thereby possible to acquire the virtual obstacle information 43 of the obstacle zone 31 even in cases where the actual obstacle information cannot be acquired by the laser range finder 13. Accordingly, it is possible to prevent so-called flickering. Moreover, it is possible to acquire the virtual obstacle information 43 of the no-entry zone 33 by designating the no-entry zone 33 as a zone to be avoided as with the obstacle zone 31. Consequently, it is possible to more reliably perform the control to avoid obstacles, and perform the control of avoiding the no-entry zone 33.

In addition, according to the present preferred embodiment, a virtual sensor output is generated by the map sensor 26 calculating the virtual obstacle information 43 of the same data format as the actual obstacle information acquired by the laser range finder 13 and the stereo camera 14. It is thereby possible to facilitate the processing of integrating the actual obstacle information acquired by the laser range finder 13 and the stereo camera 14 and the virtual obstacle information calculated by the map sensor 26. Moreover, if the map sensor 26 is subsequently added to an autonomous mobile device including the laser range finder 13 and the stereo camera 14, it is possible to minimize changes in the software to integrate the virtual obstacle information 43 that is output from the map sensor 26.

According to the present preferred embodiment, the travel control unit 28 performs the control to avoid obstacles by using the integrated obstacle information. Consequently, even if the number of sensors to detect obstacles is changed, since the integrated obstacle information is input to the travel control unit 28, it is possible to minimize the change of software in the travel control unit 28. Thus, it is possible to flexibly deal with specification changes.

A preferred embodiment of the present invention was described above, but the present invention is not limited to the foregoing preferred embodiment, and may be variously modified. For example, in the foregoing preferred embodiment, while the laser range finder 13 and the stereo camera 14 are preferably used as the device to acquire the peripheral obstacle information, the configuration is not limited thereto. For example, either the laser range finder 13 or the stereo camera 14 may be used, or an ultrasound sensor may also be combined therewith. Moreover, in foregoing preferred embodiment, the obstacle information acquired by the laser range finder 13 is preferably used to estimate the self-location of the host device, but obstacle information acquired by another stereo camera or an ultrasound sensor may also be used to estimate the self-location of the host device.

Moreover, in the foregoing preferred embodiment, the virtual obstacle information 43 having the same format as the data format of the actual obstacle information acquired by the laser range finder 13 is preferably calculated by the map sensor 26, but the configuration is not limited thereto. The map sensor 26 may also calculate virtual obstacle information having a data format that is compatible with the actual obstacle information acquired by the laser range finder 13. In the foregoing case, for example, the sensor data integration unit 27 performs processing for unifying the data format.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An autonomous mobile device, comprising:
    an obstacle sensor that acquires peripheral obstacle information;
    a storage device that stores an environment map showing an obstacle zone where an obstacle exists, and a no-entry zone map showing a no-entry zone into which entry is prohibited;
    an estimation device that estimates a self-location of the mobile device by using obstacle information acquired by the obstacle sensor and the environment map;
    a synthesizing device that generates a composite map by synthesizing the environment map and the no-entry zone map;
    a calculation device that calculates avoidance information based on the obstacle zone and the no-entry zone by using the self-location estimated by the estimation device and the composite map generated by the synthesizing device; and
    a controller arranged and programmed to control autonomous movement based on the self-location estimated by the estimation device, the environment map, and the no-entry zone map; wherein
    the controller is arranged and programmed to control the autonomous mobile device to not enter the no-entry zone even if the peripheral obstacle information indicates that no obstacle exists in the no-entry zone;
    the estimation device estimates the self-location of the mobile device without using the no-entry zone map; and
    the controller performs control to avoid the obstacle by using the avoidance information calculated by the calculation device and the obstacle information acquired by the obstacle sensor.

2. The autonomous mobile device according to claim 1, further comprising a reception device that receives an operation to set the no-entry zone, wherein the storage device stores the no-entry zone map set based on the operation received by the reception device.

3. The autonomous mobile device according to claim 1, wherein the synthesizing device generates the composite map that reflects both the obstacle zone shown on the environment map and a no-entry zone shown on the no-entry zone map for each of pixels corresponding mutually to the environment map and the no-entry zone map.

4. The autonomous mobile device according to claim 1, further comprising a planning device that plans a path to a destination by using the composite map generated by the synthesizing device, wherein the controller controls the autonomous movement based on the path planned by the planning device.

5. The autonomous mobile device according to claim 1, wherein the calculation device generates a virtual sensor output by calculating the avoidance information that is compatible with an output format of the obstacle information acquired by the obstacle sensor.

6. The autonomous mobile device according to claim 5, further comprising an integration device that integrates the obstacle information acquired by the obstacle sensor and the avoidance information calculated by the calculation device, wherein the controller performs control to avoid the obstacle by using the obstacle information and the avoidance information integrated by the integration device.

7. The autonomous mobile device according to claim 1, wherein the obstacle sensor is a laser range finder.

8. The autonomous mobile device according to claim 3, further comprising a planning device that plans a path to a destination by using the composite map generated by the synthesizing device, wherein the controller controls the autonomous movement based on the path planned by the planning device.

9. An autonomous mobile device, comprising:
an obstacle sensor that acquires peripheral obstacle information;
a storage device that stores an environment map showing an obstacle zone where an obstacle exists, and a no-entry zone map showing a no-entry zone into which entry is prohibited;
an estimation device that estimates a self-location of the mobile device by using obstacle information acquired by the obstacle sensor and the environment map;
a synthesizing device that generates a composite map by synthesizing the environment map and the no-entry zone map;
a calculation device that calculates avoidance information based on the obstacle zone and the no-entry zone by using the self-location estimated by the estimation device and the composite map generated by the synthesizing device; and
a controller arranged and programmed to control autonomous movement based on the self-location estimated by the estimation device, the environment map, and the no-entry zone map; wherein
the controller is arranged and programmed to control the autonomous mobile device to not enter the no-entry zone even if the peripheral obstacle information indicates that no obstacle exists in the no-entry zone;
the estimation device estimates the self-location of the mobile device without using the no-entry zone map;
the synthesizing device generates the composite map that reflects both the obstacle zone shown on the environment map and the no-entry zone shown on the no-entry zone map for each of pixels corresponding mutually to the environment map and the no-entry zone map; and
the controller performs control to avoid the obstacle by using the avoidance information calculated by the calculation device and the obstacle information acquired by the obstacle sensor.

10. The autonomous mobile device according to claim 9, further comprising a reception device that receives an operation to set the no-entry zone, wherein the storage device stores the no-entry zone map set based on the operation received by the reception device.

11. The autonomous mobile device according to claim 9, further comprising a planning device that plans a path to a destination by using the composite map generated by the synthesizing device, wherein the controller controls the autonomous movement based on the path planned by the planning device.

12. The autonomous mobile device according to claim 9, wherein the calculation device generates a virtual sensor output by calculating the avoidance information that is compatible with an output format of the obstacle information acquired by the obstacle sensor.

13. The autonomous mobile device according to claim 12, further comprising an integration device that integrates the obstacle information acquired by the obstacle sensor and the avoidance information calculated by the calculation device, wherein the controller performs control to avoid the obstacle by using the obstacle information and the avoidance information integrated by the integration device.

14. The autonomous mobile device according to claim 9, wherein the obstacle sensor is a laser range finder.

15. An autonomous mobile device, comprising:
an obstacle sensor that acquires peripheral obstacle information;
a storage device that stores an environment map showing an obstacle zone where an obstacle exists, and a no-entry zone map showing a no-entry zone into which entry is prohibited;
an estimation device that estimates a self-location of the mobile device by using obstacle information acquired by the obstacle sensor and the environment map;
a synthesizing device that generates a composite map by synthesizing the environment map and the no-entry zone map;
a planning device that plans a path to a destination by using the composite map generated by the synthesizing device;
a calculation device that calculates avoidance information based on the obstacle zone and the no-entry zone by using the self-location estimated by the estimation device and the composite map generated by the synthesizing device; and
a controller arranged and programmed to control autonomous movement based on the self-location estimated by the estimation device, the environment map, and the no-entry zone map; wherein
the controller is arranged and programmed to control the autonomous mobile device to not enter the no-entry zone even if the peripheral obstacle information indicates that no obstacle exists in the no-entry zone;
the estimation device estimates the self-location of the mobile device without using the no-entry zone map;
the controller controls the autonomous movement based on the path planned by the planning device; and
the controller performs control to avoid the obstacle by using the avoidance information calculated by the calculation device and the obstacle information acquired by the obstacle sensor.

16. The autonomous mobile device according to claim 15, further comprising a reception device that receives an operation to set the no-entry zone, wherein the storage device stores the no-entry zone map set based on the operation received by the reception device.

17. The autonomous mobile device according to claim 15, wherein the synthesizing device generates the composite map that reflects both the obstacle zone shown on the environment map and a no-entry zone shown on the no-entry zone map for each of pixels corresponding mutually to the environment map and the no-entry zone map.

18. The autonomous mobile device according to claim 15, wherein the calculation device generates a virtual sensor output by calculating the avoidance information that is compatible with an output format of the obstacle information acquired by the obstacle sensor.

19. The autonomous mobile device according to claim 18, further comprising an integration device that integrates the obstacle information acquired by the obstacle sensor and the avoidance information calculated by the calculation device, wherein the controller performs control to avoid the obstacle by using the obstacle information and the avoidance information integrated by the integration device.

20. The autonomous mobile device according to claim 15, wherein the obstacle sensor is a laser range finder.

\* \* \* \* \*